United States Patent
Rawat et al.

(10) Patent No.: US 12,388,634 B2
(45) Date of Patent: Aug. 12, 2025

(54) CUSTOMER PREMISES EQUIPMENT ACCESS USING PASSWORD-OF-THE-DAY

(71) Applicant: Charter Communications Operating, LLC, St. Louis, MO (US)

(72) Inventors: Deependra Singh Rawat, Highlands Ranch, CO (US); Shlomo Ovadia, Denver, CO (US); Daniel Roy Lynch, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 218 days.

(21) Appl. No.: 18/311,697

(22) Filed: May 3, 2023

(65) Prior Publication Data

US 2024/0372715 A1    Nov. 7, 2024

(51) Int. Cl.
H04L 9/08    (2006.01)

(52) U.S. Cl.
CPC ........ H04L 9/0863 (2013.01); H04L 2209/56 (2013.01)

(58) Field of Classification Search
CPC .......... H04L 9/0863; H04L 2209/56
See application file for complete search history.

(56) References Cited

U.S. PATENT DOCUMENTS

| | | | | |
|---|---|---|---|---|
| 2009/0264137 A1* | 10/2009 | Soliman | ................ | H04W 64/00 455/456.1 |
| 2014/0281506 A1* | 9/2014 | Redberg | .............. | H04L 63/0442 713/159 |
| 2018/0337783 A1* | 11/2018 | Lu | ......................... | H04L 63/083 |

* cited by examiner

*Primary Examiner* — Henry Tsang
(74) *Attorney, Agent, or Firm* — Young Basile Hanlon & MacFarlane, P.C.

(57) ABSTRACT

Methods and systems for configuring a main or security processor in a customer premises equipment (CPE) with an encrypted seed for password-of-the-day (PoTD) processing is described. A CPE includes a modem processor, a main processor, and a PoTD component included on the main processor. The main processor receives, via the modem processor from a user device, an access request to the CPE. In response to the access request, the PoTD component accesses an encrypted seed stored on the main processor, generates a PoTD from the encrypted seed, and provides an access response based on comparison of the generated PoTD with a PoTD provided via the user device. A security processor can be used in lieu of the main processor. The PoTD component is then included in the security processor and the encrypted seed is then stored on the security processor.

24 Claims, 10 Drawing Sheets

CUSTOMER PREMISES EQUIPMENT ACCESS USING PASSWORD-OF-THE-DAY

TECHNICAL FIELD

This disclosure relates to network device access. More specifically, configuring a main processor in a customer premises equipment with an encrypted seed for password-of-the-day processing.

BACKGROUND

Service providers provide Internet and deliver content (collectively "services") to its customers via multiple access customer premises equipment (CPE) which are connected to a service provider system via a coaxial cable system. The CPEs were developed by various silicon and original equipment manufacturer (OEM) vendors. These CPEs include monolithic and proprietary software stacks designed to meet a service providers' specifications. One of the service providers' specifications is security specifications which require the use of the Password-of-The-Day (PoTD). The PoTD, for example, enables a technician to remotely login and access the access CPE either via secure cryptographic network protocols such as secure shell (SSH) or Hypertext Transfer Protocol Secure (HTTPS) protocols.

Moving forward, service providers are developing their own software stacks including PoTD modules. Given that the current stacks are or include proprietary software stack components, solutions are needed which efficiently provide PoTD capabilities.

SUMMARY

Disclosed herein are methods and systems for configuring a main processor or security processor in a customer premises equipment with an encrypted seed for PoTD processing. In implementations, a customer premises equipment device includes a modem processor, a main processor in communication with the modem processor, and a password-of-the-day component included on the main processor. The main processor is configured to receive, via the modem processor from a user device, an access request to the customer premises equipment device. In response to the access request, the password-of-the-day component is configured to access an encrypted seed stored on the main processor, generate a password-of-the-day from the encrypted seed, and provide an access response based on comparison of the generated password-of-the-day with a password-of-the-day provided via the user device. A security processor can be used in lieu of the main processor. The PoTD component is then included in the security processor and the encrypted seed is then stored on the security processor.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
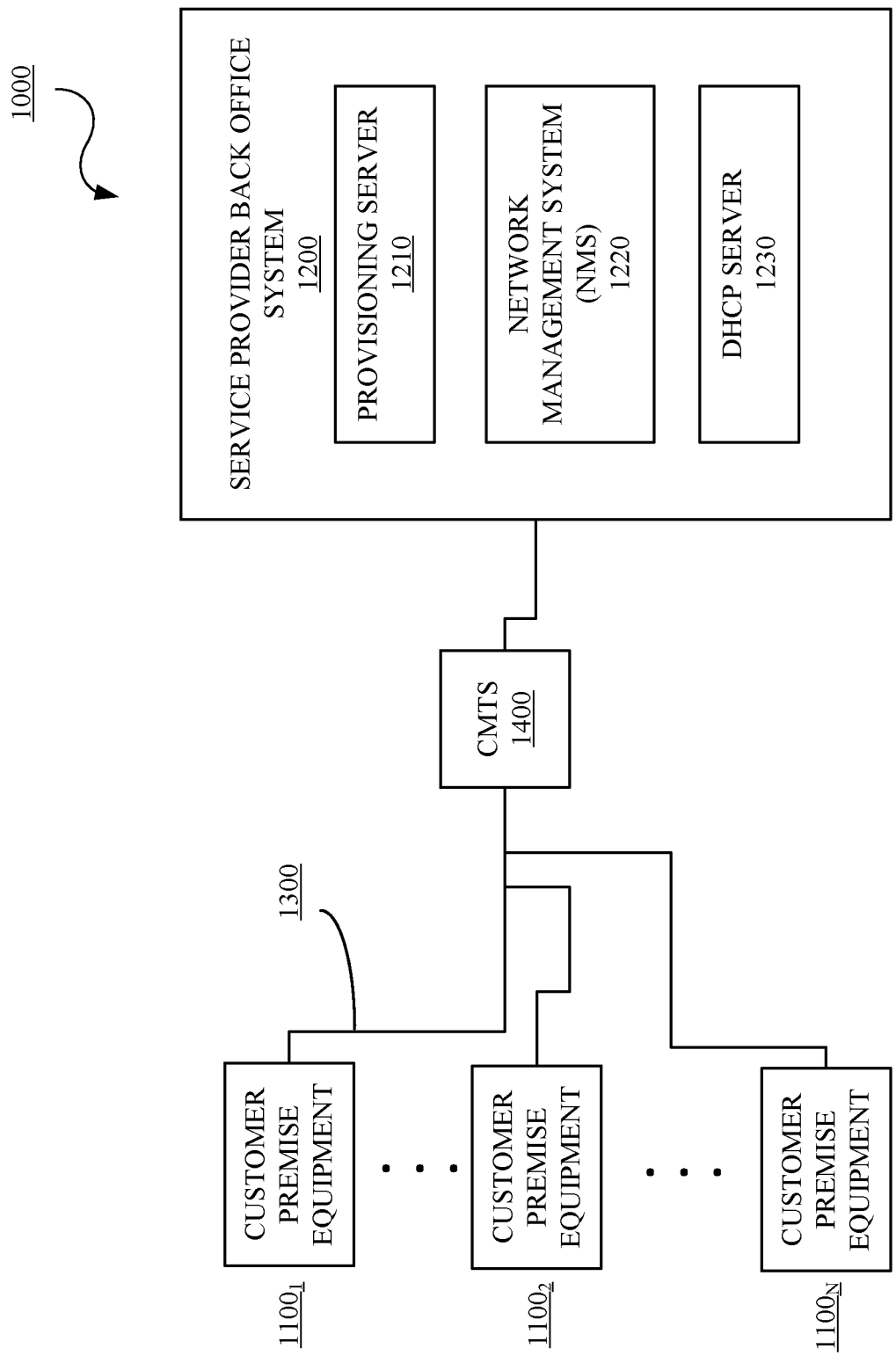
FIG. 1 is a diagram of an example of a network architecture in accordance with implementations of this disclosure.

Reference will now be made in greater detail to implementations of the disclosure, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described implementations that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed implementations, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example network architecture $1000$. The network architecture $1000$ can include one or more customer premises equipment (CPE) $1100_1$, $1100_2$, ..., $1100_N$ connected to or in communication with (collectively "connected to") a service provider back-office system $1200$ via a hybrid fiber coaxial cable (HFC), coaxial cable system, and/or combinations thereof (collectively "coaxial cable system") $1300$. The service provider back-office system $1200$ can include service provider servers, networks, or clouds including, but not limited to, a provisioning server $1210$, a network management system (NMS) $1220$, and a Dynamic Host Configuration Protocol (DHCP) server $1230$. The network architecture $1000$ and the components therein may include other elements which may be desirable or necessary to implement the devices, systems, and methods described herein. However, because such elements and steps are well known in the art, and because they do not facilitate a better understanding of the disclosed implementations, a discussion of such elements and steps may not be provided herein.

The CPE $1100_1$, $1100_2$, ..., $1100_N$ can be cable modems, Embedded Multimedia Terminal Adapters (eMTAs), optical network unit (ONU) devices, gateways, routers, set-top boxes, and the like which provides connectivity including Internet connectivity, wired connectivity, wireless connectivity, data, voice over IP, and combinations thereof. In implementations, the CPE $1100_1$, $1100_2$, ..., $1100_N$ can include a voice gateway and external battery backup (EBBU) in case of external power failure. The CPE $1100_1$, $1100_2$, ..., $1100_N$ can be deployed, for example, at a customer premises, residence, office, and the like.

The service provider back-office system $1200$ can include multiple components to provide services to customers via the CPE $1100_1$, $1100_2$, ..., $1100_N$.

The provisioning server $1210$ can provide configuration information and data to components in the network architecture $1000$ including, for example, the CPE $1100_1$, $1100_2$, ..., $1100_N$. The configuration information and data enable operation of the CPE $1100_1$, $1100_2$, ..., $1100_N$. The NMS $1220$ can include applications which monitor, maintain, and optimize a network. The DHCP server $1230$ can manage Internet Protocol (IP) addresses it allocates to network nodes.

Figure 1A:
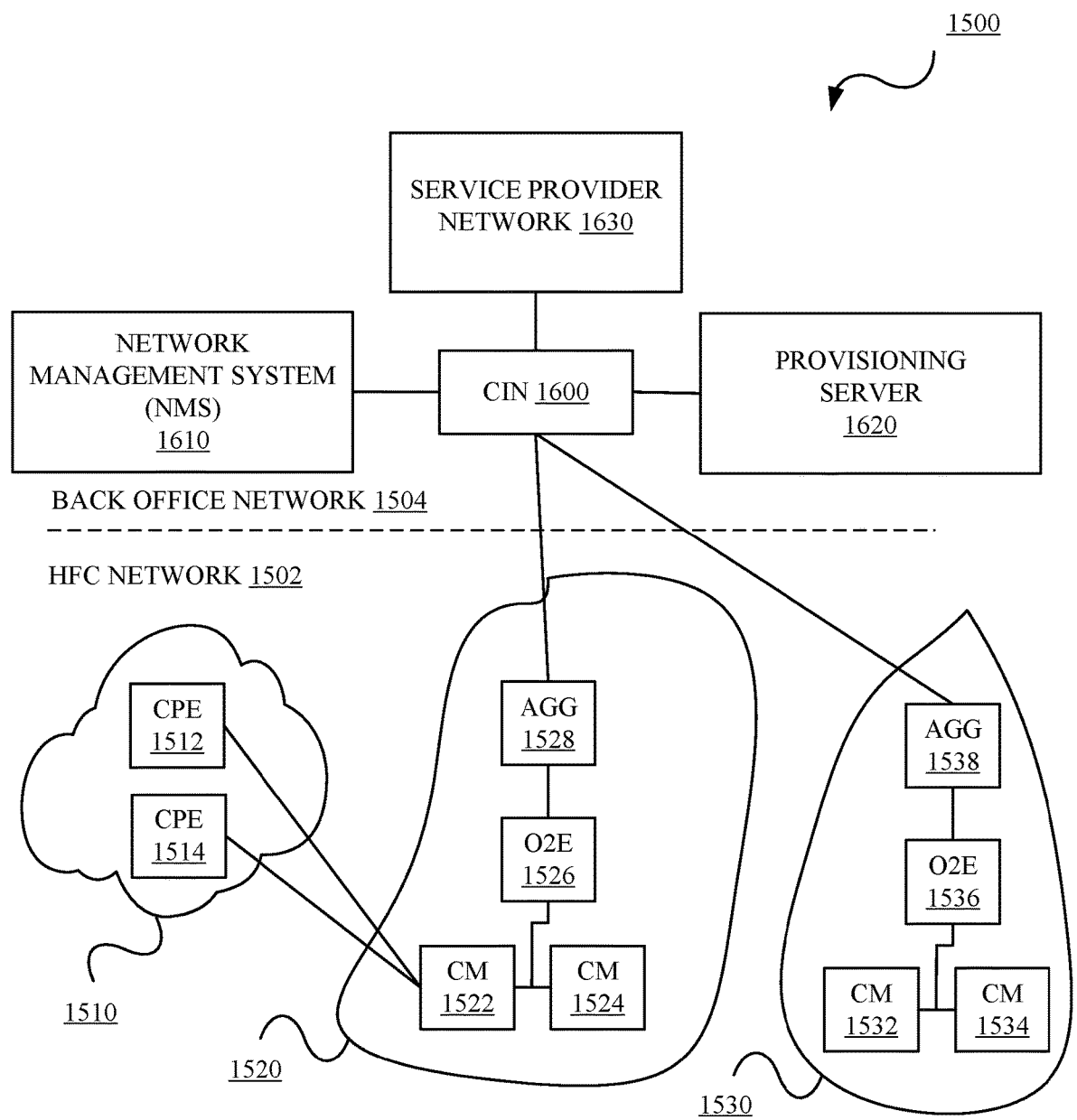
FIG. 1A is a diagram of an example of a network architecture in accordance with implementations of this disclosure.

FIG. 1A is a diagram of an example network architecture 1500. The network architecture 1500 can include one or more CPEs 1512 and 1514 deployed on a local area network (LAN) 1510 and connected to network components 1520 in a hybrid fiber-coaxial (HFC) network 1502. The HFC network 1502 can include any number of network components including, but not limited to, network components 1520 and 1530. The network components 1520 and 1530 can be connected to a converged interconnect network (CIN) 1600 in a service provider's back-office network 1504. The service provider's back-office network 1504 can include, but is not limited to, an NMS 1610, a provisioning system 1620, and a service provider cloud network 1630. The network architecture 1500 and the components therein may include other elements which may be desirable or necessary to implement the devices, systems, and methods described herein. However, because such elements and steps are well known in the art, and because they do not facilitate a better understanding of the disclosed implementations, a discussion of such elements and steps may not be provided herein.

The CPEs 1512 and 1514 can be cable modems, Embedded Multimedia Terminal Adapters (eMTAs), optical network unit (ONU) devices, gateways, routers, set-top boxes, and the like which provides connectivity including Internet connectivity, wired connectivity, wireless connectivity, data, voice over IP, and combinations thereof. In implementations, the CPEs 1512 and 1514 can include a voice gateway and external battery backup (EBBU) in case of external power failure. The CPEs 1512 and 1514 can be deployed, for example, at a customer premises, residence, office, and the like.

The provisioning server 1610 can provide configuration information and data to components in the network architecture 1500 including, for example, the CPEs 1512 and 1514. The configuration information and data enable operation of the CPEs 1512 and 1514. The NMS 1610 can include applications which monitor, maintain, and optimize a network.

The network components 1520 and 1530 can include, but are not limited to, cable modems (CM) 1522, 1524, 1532, and 1534, optical-to-electrical (O2E) converters 1526 and 1536, and aggregators 1528 and 1538, respectively. The aggregators 1528 and 1538 can be, for example, a CMTS or a Converged Cable Access Platform (CCAP).

Figure 2:
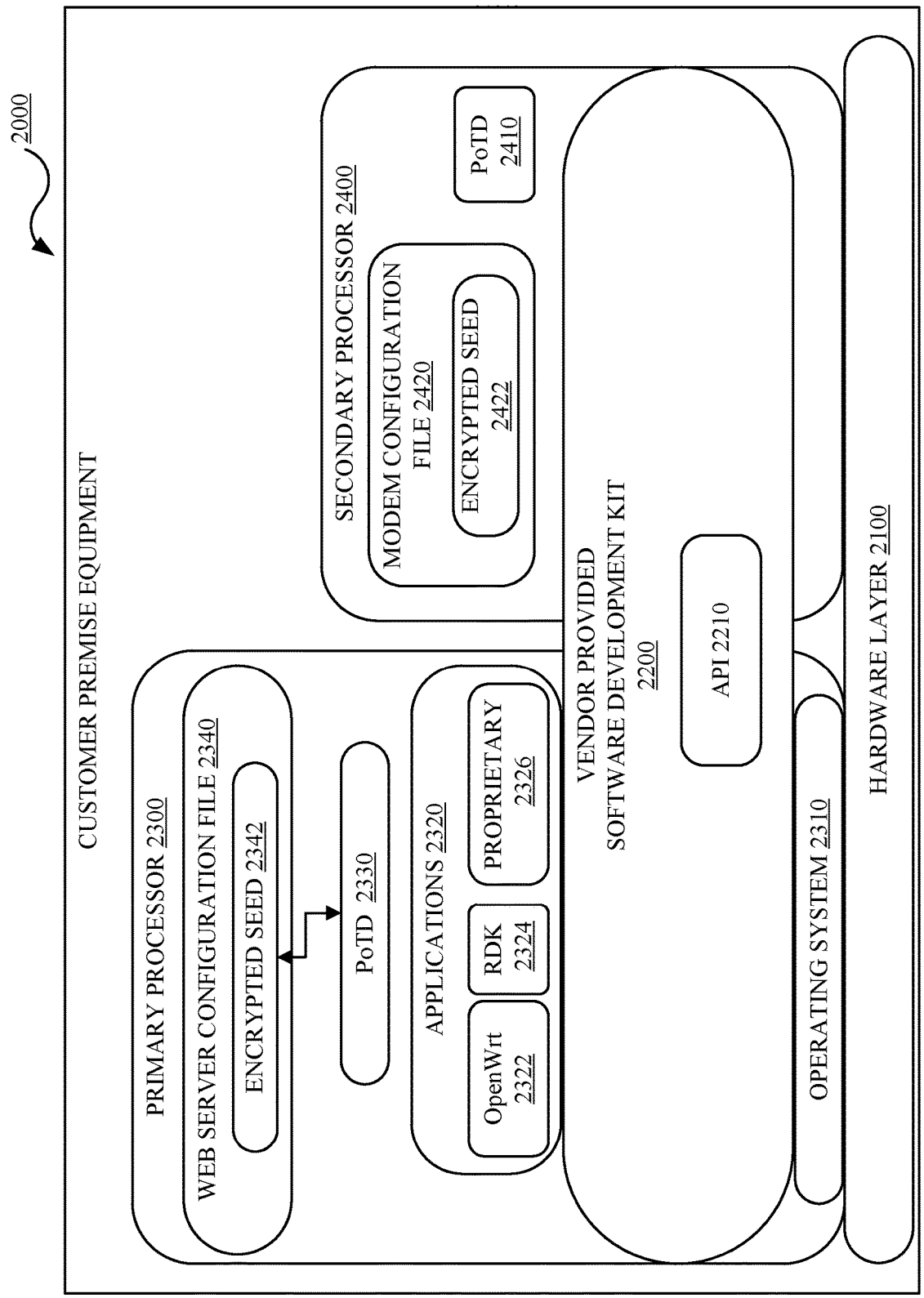
FIG. 2 is a block diagram of an example of a customer premises equipment in accordance with implementations of this disclosure.

FIG. 2 is a block diagram of an example CPE 2000 in accordance with implementations of this disclosure. In implementations, the CPE 2000 can be the CPE 1100$_1$, 1100$_2$, ..., 1100$_N$ of FIG. 1. The CPE 2000 implements a hardware layer 2100, a vendor provided software development kit (SDK) 2200, and a dual processor configuration including a router/gateway, main, or primary processor (collectively "gateway processor") 2300 and a cable modem or secondary processor (collectively "cable modem processor") 2400.

The gateway processor 2300 includes a stack which includes, but is not limited to, an operating system 2310, applications 2320, a PoTD module, component, generator, or software (collectively "PoTD component") 2330, and a web server configuration file 2340. The applications 2320 can include, but is not limited to, an OpenWrt Linux operating system 2322, a Reference Design Kit (RDK) 2324, and proprietary software 2326. The web server configuration file 2340 includes an encrypted seed 2342. The gateway processor 2300 is provisioned with the web server configuration file 2340 during registration and provisioning by a provisioning server, such as the provisioning server 1210. The gateway processor 2300 is directed to the operation and functionality of the CPE 2000.

The cable modem processor 2400 includes a stack which includes, but is not limited to, a PoTD component 2410 and a modem configuration file 2420. The modem configuration file 2420 can include, but is not limited to, configuration information and an encrypted seed 2422. The cable modem processor 2400 is provisioned with the modem configuration file 2420 during registration and provisioning by a provisioning server, such as the provisioning server 1210. The cable modem processor 2400 is directed to the operation and functionality of Data Over Cable Service Interface Specification (DOCSIS) protocol suites including, but not limited to, DOCSIS 4.0 and DOCSIS 3.1.

The gateway processor 2300 is a more powerful processor than the cable modem processor 2400. That is, the cable modem processor 2400 is limited in capability and functionality.

The SDK 2200 can include, but is not limited to, Application Programming Interfaces (APIs) 2210 which provide communication connectivity between various components in the CPE 2000 including between the hardware layer 2100, the gateway processor 2300, and/or the cable modem processor 2400. For example, the SDK 2220 can include proprietary APIs to enable an end-user to access limited DOCSIS information available from the cable modem processor 2400 to the gateway processor 2300, provide secure boot-up of the silicon, check the device flash/DRAM memories and memory partitions, load the device tree, and establish a Chain-of-Trust (CoT) between the silicon and the applications.

A user or technician can access the CPE 2000 using a user terminal, laptop, or device (collectively "user device") which also includes a PoTD component. The CPE 2000 can be accessed via SSH or HTTPS protocols using the PoTD generated by the PoTD component on the user device.

When accessing the CPE 2000 using the SSH protocol, the user uses the PoTD component on the user device to generate a PoTD, password, or credential (collectively "PoTD"). The user device transmits or sends a SSH protocol request, which is received and processed by the cable modem processor 2400. The user sends the PoTD via the user device responsive to the cable modem processor 2400. The PoTD component 2410 fetches the encrypted seed 2422 from the modem configuration file 2420 to generate a PoTD in response to the request. The PoTD component 2410 then compares, verifies, and/or authenticates (collectively "verifies" and referred to as verification processing) the generated PoTD against the user provided PoTD to determine if the user is granted or denied access to the CPE 2000. If the entered password matches a generated password, the PoTD component 2410 allows the user to access the CPE 2000. If the entered password does not match the generated password, the PoTD component 2410 denies the user access to the CPE 2000. The PoTD processing is performed in the cable modem processor 2400.

When accessing the CPE 2000 using the HTTPS protocol, the user uses the PoTD component on the user device to generate a PoTD. The user uses a web browser on the user device to transmits or sends an authentication request, which is received and processed by the cable modem processor 2400. Since this is a web based or browser based protocol, the cable modem processor 2400 passes the authentication request to the gateway processor 2300. That is, the web server runs on the gateway processor 2300 and not on the cable modem processor 2400. The gateway processor 2300 has to execute one or more new or additional remote procedure calls (RPCs) to the PoTD component 2410 to perform the verification processing. This is because the PoTD component 2410 has access to the encrypted seed 2422. The gateway processor 2300 does not have access to an encrypted seed. The gateway processor 2300 cannot perform the verification process without the assistance of the cable modem processor 2400 and the new or additional RPCs.

To eliminate the new or additional RPCs, the encrypted seed 2342 can be included in the web server configuration file 2340 during the firmware image build of the gateway processor 2300. That is, the web server configuration file 2340 includes an encrypted seed 2342 which is built into the firmware of the gateway processor 2300. The gateway processor 2300 is provisioned by a provisioning server, such as the provisioning server 1210. As a result, the gateway processor 2300 and the PoTD component 2330 can perform the verification processing without the need of the new or additional RPCs. A new image or code based would need to be downloaded to the CPE 2000 to update the encrypted seed 2342.

Figure 3:
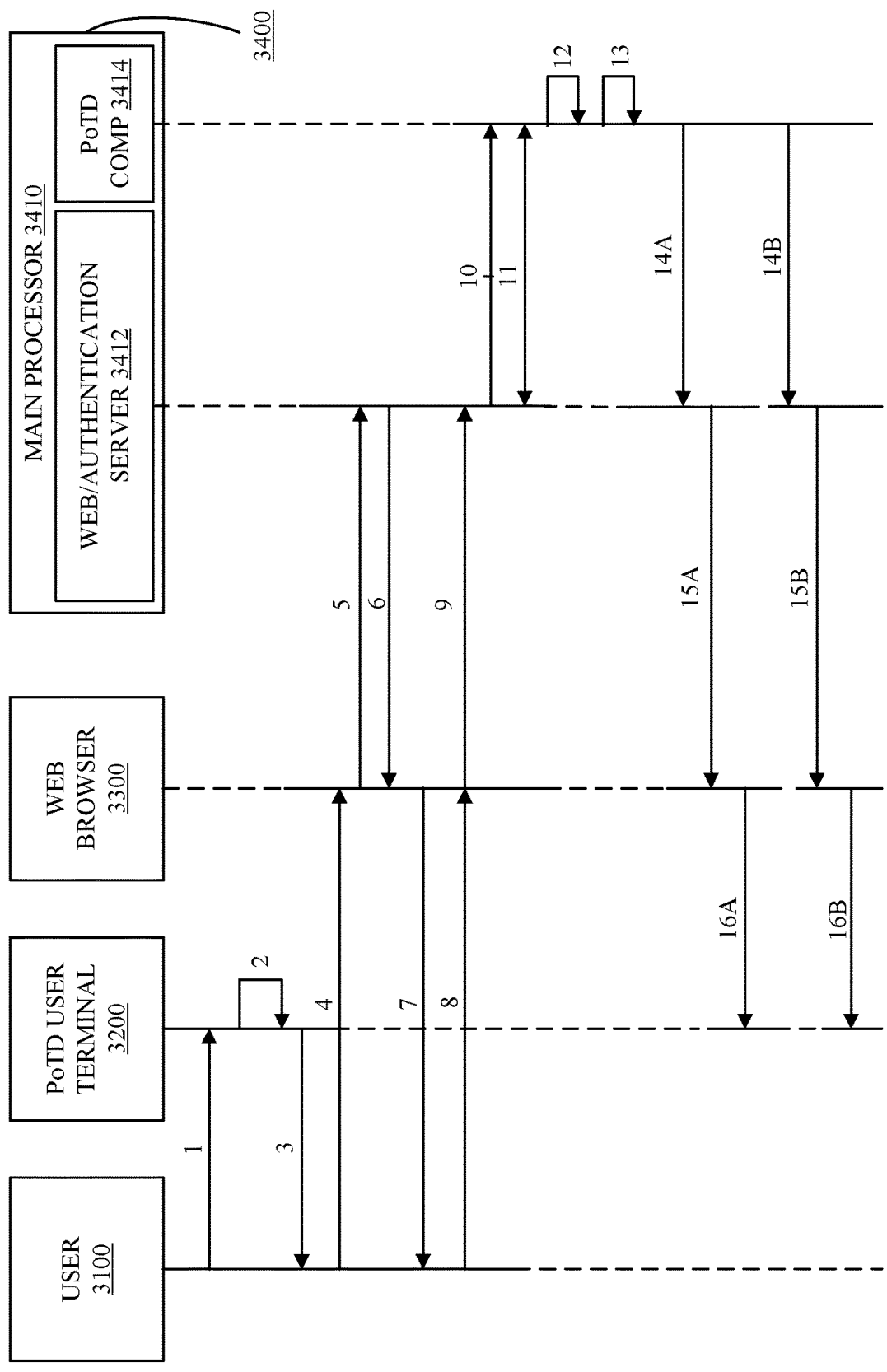
FIG. 3 is a flow diagram of an example flow for configuring a main processor in a customer premises equipment with an encrypted seed for PoTD in accordance with implementations of this disclosure.

FIG. 3 is a flow diagram of an example flow 3000 for configuring a main processor in a customer premises equipment with an encrypted seed for PoTD in accordance with implementations of this disclosure. The flow 3000 is operable between a user 3100, a PoTD component 3200 on a user terminal or device, a web browser 3300, and a CPE 3400 including a main processor 3410 which has a web server 3412 and a PoTD component 3414. The CPE 3400 can be the CPE 2000 of FIG. 2 and the CPE $1100_1$, $1100_2$, ..., $1100_N$ as used in FIG. 1.

The user 3100 requiring access to the CPE 3400 can execute the PoTD component 3200 (1). The PoTD component 3200 can generate a PoTD based on an encrypted seed in the PoTD component 3200 (which is the same value stored on the CPE 3400) and a current date (2). The generated PoTD can be displayed or made visible to the user 3100 (3). The user 3100 can open or access the appropriate webpage of the CPE 3400 via the web browser 3300 (4), which in turn can send an authentication and/or webpage request to the web server 3412 (5). The web server 3412 can perform a redirect message to the web browser 3300 (6) to request a credential form from the user 3100 (7). The user 3100 can enter the PoTD into the web browser (8), which in turn can forward the PoTD to the web server 3412 for authentication or verification (9). The web server 3412 can forward the PoTD to the PoTD component 3414 (10), which in turn can fetch an encrypted seed from the web configuration file (11). The PoTD component 3414 can generate the PoTD using the encrypted seed and the current date (12). The PoTD module 3414 can compare the generated PoTD with the user provided PoTD (13). In the event that the generated PoTD matches the user provided PoTD (14A), the web server 3142 can send an authorization message to the web browser 3300 (15A), which in turn can grant the user 3100 access to the CPE 3400 (16A). In implementations, the CPE 3400 can include a timer to limit an access session duration to a defined period of time. In implementations, the defined period of time can range from 15 to 60 minutes. In implementations, the defined period of time is dynamic, configurable, and/or combinations thereof. In the event that the generated PoTD does not match the user provided PoTD (14B), the web server 3142 can send a denial message to the web browser 3300 (15B), which in turn can deny the user 3100 access to the CPE 3400 (16B). In implementations, the CPE 3400 can include a counter to limit or set the number of retries a user has to gain access before the user is locked out. In implementations, the counter is dynamic, configurable, and/or combinations thereof.

Figure 3A:
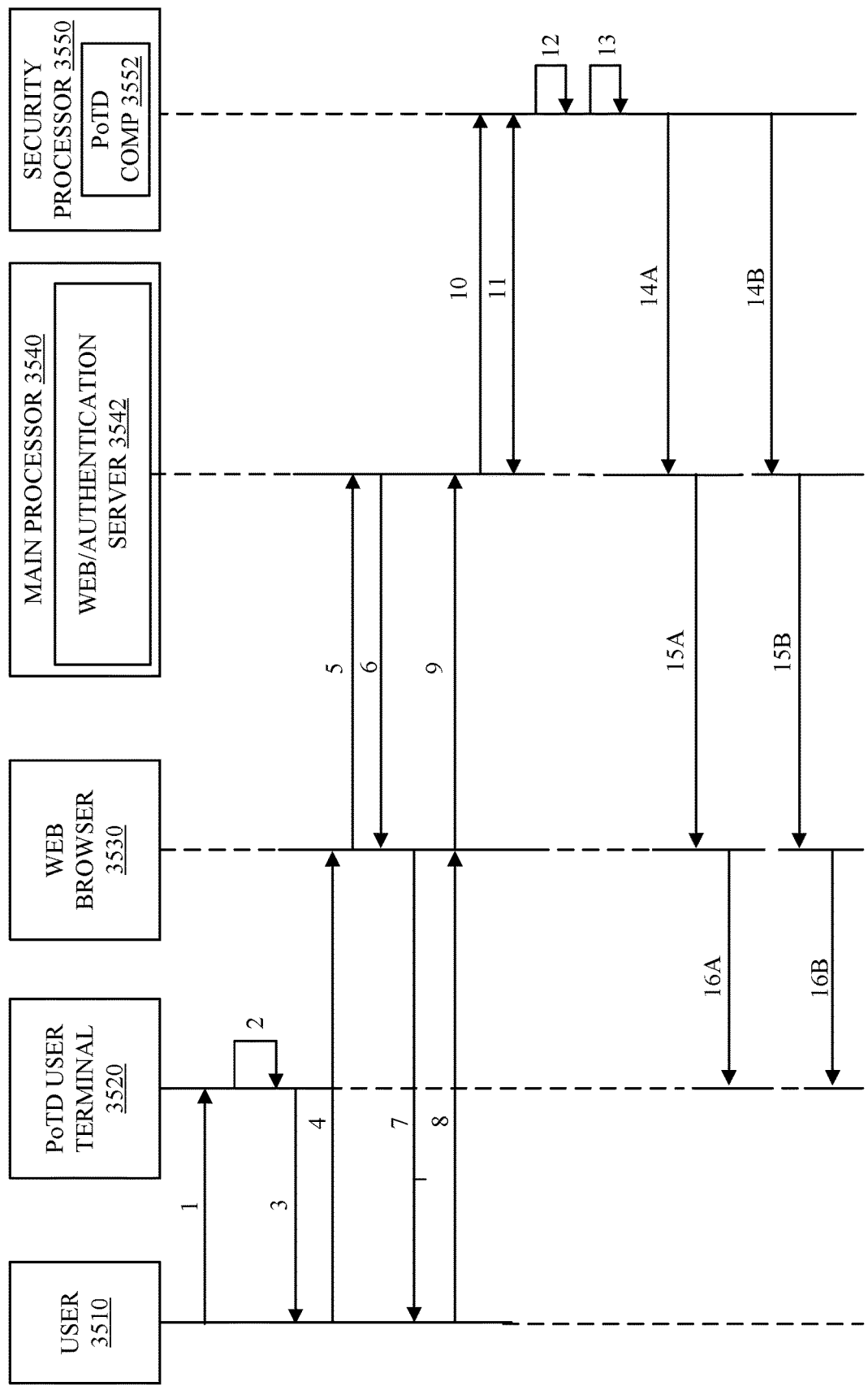
FIG. 3A is a flow diagram of an example flow for configuring a main processor in a customer premises equipment with an encrypted seed for PoTD processing with a security processor in accordance with implementations of this disclosure.

FIG. 3A is a flow diagram of an example flow 3500 for CPE processing with an encrypted seed for PoTD processing using a security processor in accordance with implementations of this disclosure. The flow 3500 is operable between a user 3510, a PoTD component 3520 on a user terminal or device, a web browser 3530, and a CPE including a main processor 3540 which has a web server 3542 and security processor 3550 which has a PoTD component 3552. The CPE can be the CPE 2000 of FIG. 2 and the CPE $1100_1$, $1100_2$, ..., $1100_N$ as used in FIG. 1, with the inclusion of the security processor 3550 in a multi-processor configuration.

The user 3510 requiring access to the CPE can execute the PoTD component 3520 (1). The PoTD component 3520 can generate a PoTD based on an encrypted seed in the PoTD component 3520 (which is the same value stored on the CPE) and a current date (2). The generated PoTD can be displayed or made visible to the user 3510 (3). The user 3510 can open or access the appropriate webpage of the CPE via the web browser 3530 (4), which in turn can send an authentication and/or webpage request to the web server 3542 (5). The web server 3542 can perform a redirect message to the web browser 3530 (6) to request a credential form from the user 3510 (7). The user 3510 can enter the PoTD into the web browser 3530 (8), which in turn can forward the PoTD to the web server 3542 for authentication or verification (9). The web server 3542 can forward the PoTD to the PoTD component 3552 (10), which in turn can fetch an encrypted seed from the web configuration file on the main processor 3542 (11). The PoTD component 3552 can generate the PoTD using the encrypted seed and the current date (12). The PoTD module 3552 can compare the generated PoTD with the user provided PoTD (13). In the event that the generated PoTD matches the user provided PoTD (14A), the web server 3542 can send an authorization message to the web browser 3530 (15A), which in turn can grant the user 3510 access to the CPE (16A). In implementations, the CPE can include a timer to limit an access session duration to a defined period of time. In implementations, the defined period of time can range from 15 to 60 minutes. In implementations, the defined period of time is dynamic, configurable, and/or combinations thereof. In the event that the generated PoTD does not match the user provided PoTD (14B), the web server 3542 can send a denial message to the web browser 3530 (15B), which in turn can deny the user 3510 access to the CPE (16B). In implementations, the CPE can include a counter to limit or set the number of retries a user has to gain access before the user is locked out. In implementations, the counter is dynamic, configurable, and/or combinations thereof.

Figure 4:
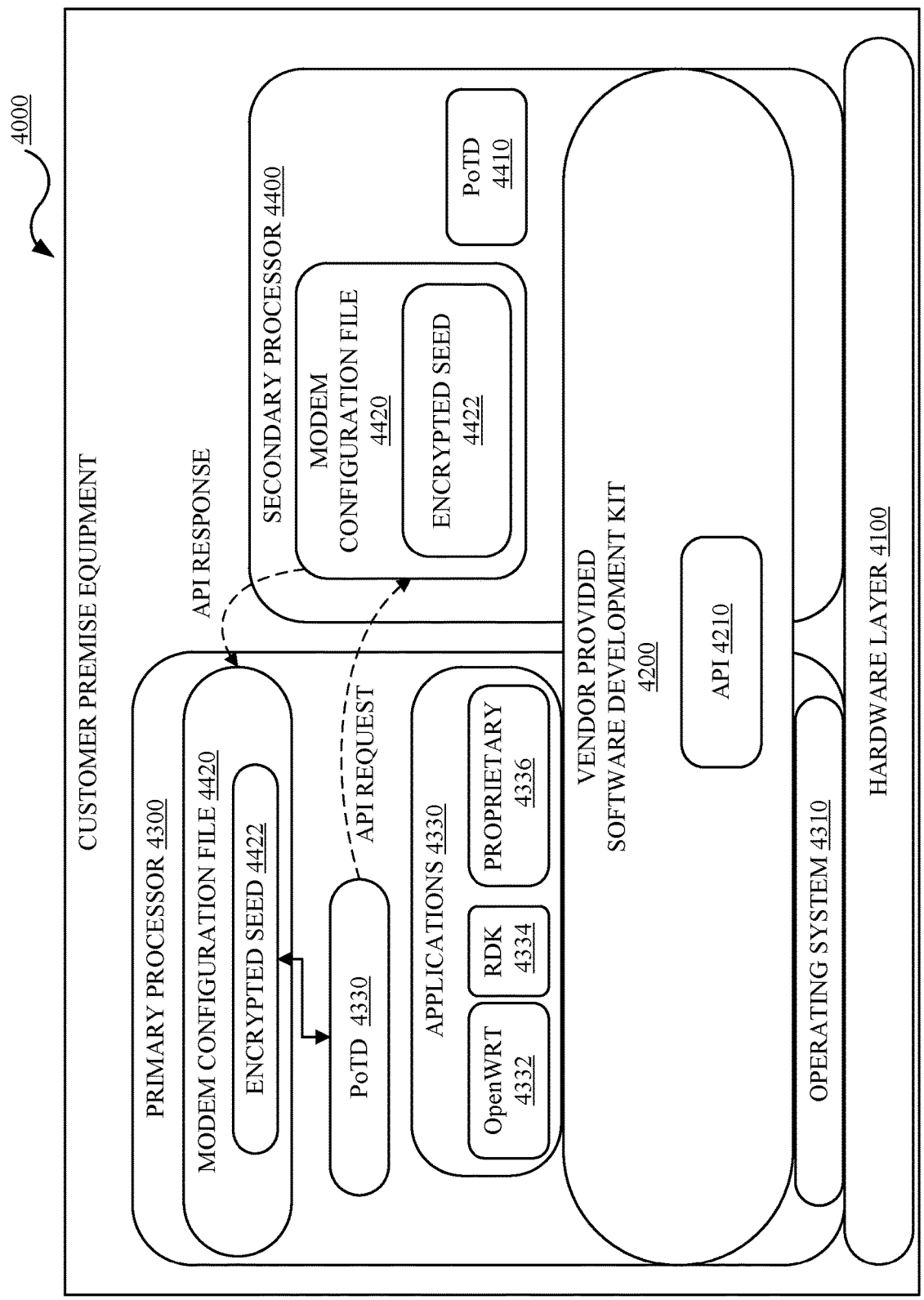
FIG. 4 is a block diagram of an example of a customer premises equipment in accordance with implementations of this disclosure.

FIG. 4 is a block diagram of an example of a CPE 4000 in accordance with implementations of this disclosure. In implementations, the CPE 4000 can be the CPE $1100_1$, $1100_2$, ..., $1100_N$ of FIG. 1. The CPE 4000 implements a hardware layer 4100, a vendor provided SDK 4200, and a dual processor configuration including a router/gateway, main, or primary processor (collectively "gateway processor") 4300 and a cable modem or secondary processor (collectively "cable modem processor") 4400.

The gateway processor 4300 includes a stack which includes, but is not limited to, an operating system 4310, applications 4320, and a PoTD module, component, generator, or software (collectively "PoTD component") 4330. The applications 4320 can include, but is not limited to, an OpenWrt Linux operating system 4332, a RDK 4334, and proprietary software 4336. The gateway processor 4300 is directed to the operation and functionality of the CPE 4000.

The cable modem processor 4400 includes a stack which includes, but is not limited to, a PoTD component 4410 and a modem configuration file 4420. The modem configuration file 4420 can include, but is not limited to, configuration information and an encrypted seed 4422. The cable modem processor 4400 is provisioned with the modem configuration file 4420 during registration and provisioning by a provisioning server, such as the provisioning server 1210. The cable modem processor 4400 is directed to the operation and functionality of DOCSIS protocol suites including, but not limited to, PacketCable 1.5/2.0.

The gateway processor 4300 is a more powerful processor than the cable modem processor 4400. That is, the cable modem processor 4400 is limited in capability and functionality.

The SDK 4200 can include, but is not limited to, APIs 4210 which provide communication connectivity between various components in the CPE 4000 including between the hardware layer 4100, the gateway processor 4300, and/or the cable modem processor 4400. For example, the SDK 4200 can include proprietary APIs to enable an end-user to access limited DOCSIS information available from the cable modem processor 2400 to the gateway processor 2300.

As described with respect to FIG. 2, a user or technician can access the CPE 4000 using a user terminal, laptop, or device (collectively "user device") which also includes a PoTD component. The CPE 4000 can be accessed via SSH as described with respect to FIG. 2.

To eliminate the new or additional RPCs when accessing via HTTPS as described with respect to FIG. 2, the gateway processor 4300 can determine if the modem configuration file 4420 is already available and stored in the gateway processor 4300 as a result of other processing requiring the configuration information in the modem configuration file 4420. If the modem configuration file 4420 is not stored in the gateway processor 4300, the gateway processor 4300 can use the already provided API 4210 to request the modem configuration file 4420. The API request is a one time RPC. In implementations, updates to the encrypted seed 4422 can be pushed out to the CPE 4000 by the service provider back-office system 1200 and/or the provisioning server 1210, as appropriate and as needed. The modem configuration file 4420 is then stored in the gateway processor 4300. The PoTD component 4330 can extract the encrypted seed 4422 from the modem configuration file 4420 and store as a global variable in or on the gateway processor 4300. The PoTD component 4330 can then use the encrypted seed 4422 to generate a PoTD as needed. In both instances, as a result, the gateway processor 4300 and the PoTD component 4330 can perform the verification processing without the need of the new or additional RPCs.

Figure 5:
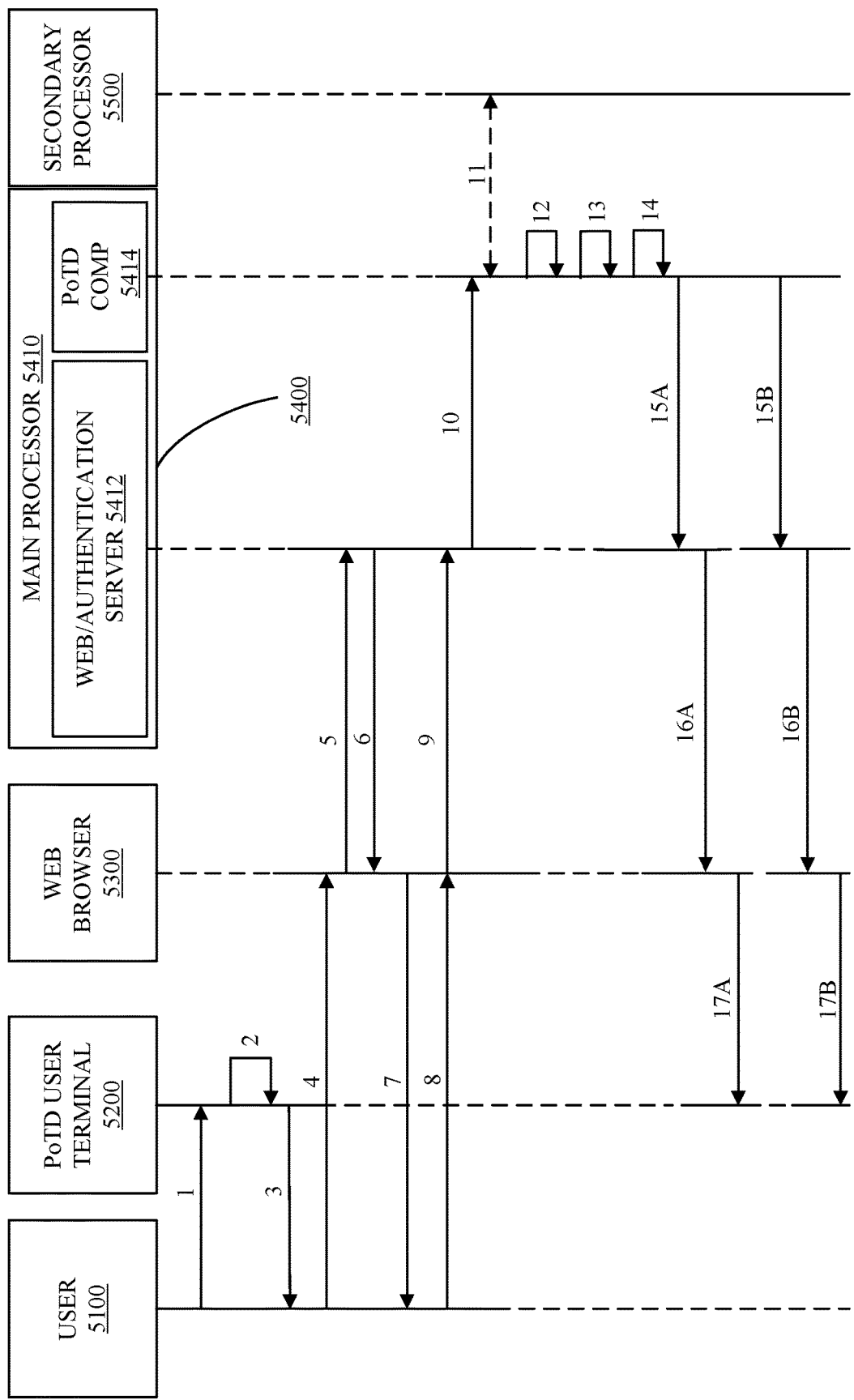
FIG. 5 is a flow diagram of an example flow for configuring a main processor in a customer premises equipment with an encrypted seed for PoTD in accordance with implementations of this disclosure.

FIG. 5 is a flow diagram of an example flow 5000 for configuring a main processor in a customer premises equipment with an encrypted seed for PoTD in accordance with implementations of this disclosure. The flow 5000 is operable between a user 5100, a PoTD component 5200 on a user terminal or device, a web browser 5300, a CPE 5400 including a main processor 5410 which has a web server 5412 and a PoTD component 5414, and a secondary or cable processor 5500. The CPE 5400 can be the CPE 4000 of FIG. 4 and the CPE $1100_1$, $1100_2$, . . . , $1100_N$ as used in FIG. 1.

The user 5100 requiring access to the CPE 5400 can execute the PoTD component 5200 (1). The PoTD component 5200 can generate a PoTD based on an encrypted seed in the PoTD component 5200 (which is the same value stored on the CPE 5400) and a current date (2). The generated PoTD can be displayed or made visible to the user 5100 (3). The user 5100 can open or access the appropriate webpage of the CPE 5400 via the web browser 5300 (4), which in turn can send an authentication and/or webpage request to the web server 5412 (5). The web server 5412 can perform a redirect message to the web browser 5300 (6) to request a credential form from the user 5100 (7). The user 5100 can enter the PoTD into the web browser (8), which in turn can forward the PoTD to the web server 5412 for authentication or verification (9). The web server 5412 can forward the PoTD to the PoTD component 5414 (10). The PoTD component 5414 can determine if the modem configuration file 4420 is already available on the main processor 5410, extract an encrypted seed if the modem configuration file 4420 is available, and store as a global variable. This can be a one-time operation. If the modem configuration file 4420 is not available on the main processor 5410, then the PoTD component 5414 can make an API call to the secondary or cable processor 5500 to get the modem configuration file (11). The PoTD component 5414 can then fetch the encrypted seed from the modem configuration file and store the encrypted seed as a global variable in the PoTD component 5414 on the main processor 5410 (12). In implementations, the PoTD component 5414 can delete the modem configuration file on the main processor 5410. The PoTD component 5414 can generate the PoTD using the encrypted seed and the current date (13). The PoTD component 5414 can compare the generated PoTD with the user provided PoTD (14). In the event that the generated PoTD matches the user provided PoTD (15A), the web server 5142 can send an authorization message to the web browser 5300 (16A), which in turn can grant the user 5100 access to the CPE 5400 (17A). In implementations, the CPE 5400 can include a timer to limit an access session duration to a defined period of time. In implementations, the defined period of time can range from 15 to 60 minutes. In implementations, the defined period of time is dynamic, configurable, and/or combinations thereof. In the event that the generated PoTD does not match the user provided PoTD (15B), the web server 5142 can send a denial message to the web browser 5300 (16B), which in turn can deny the user 5100 access to the CPE 5400 (17B). In implementations, the CPE 5400 can include a counter to limit or set the number of retries a user has to gain access before the user is locked out. In implementations, the counter is dynamic, configurable, and/or combinations thereof.

The flow 5000 can use an already available API call (RPC call) to the secondary processor to obtain the modem configuration file. The flow 5000 does not need to create a new RPC to pass and get verified user entered password. The flow 5000 can enable the PoTD component 5414 to use a dynamic encrypted seed from the modem configuration file if and when the modem configuration file is updated.

Figure 5A:
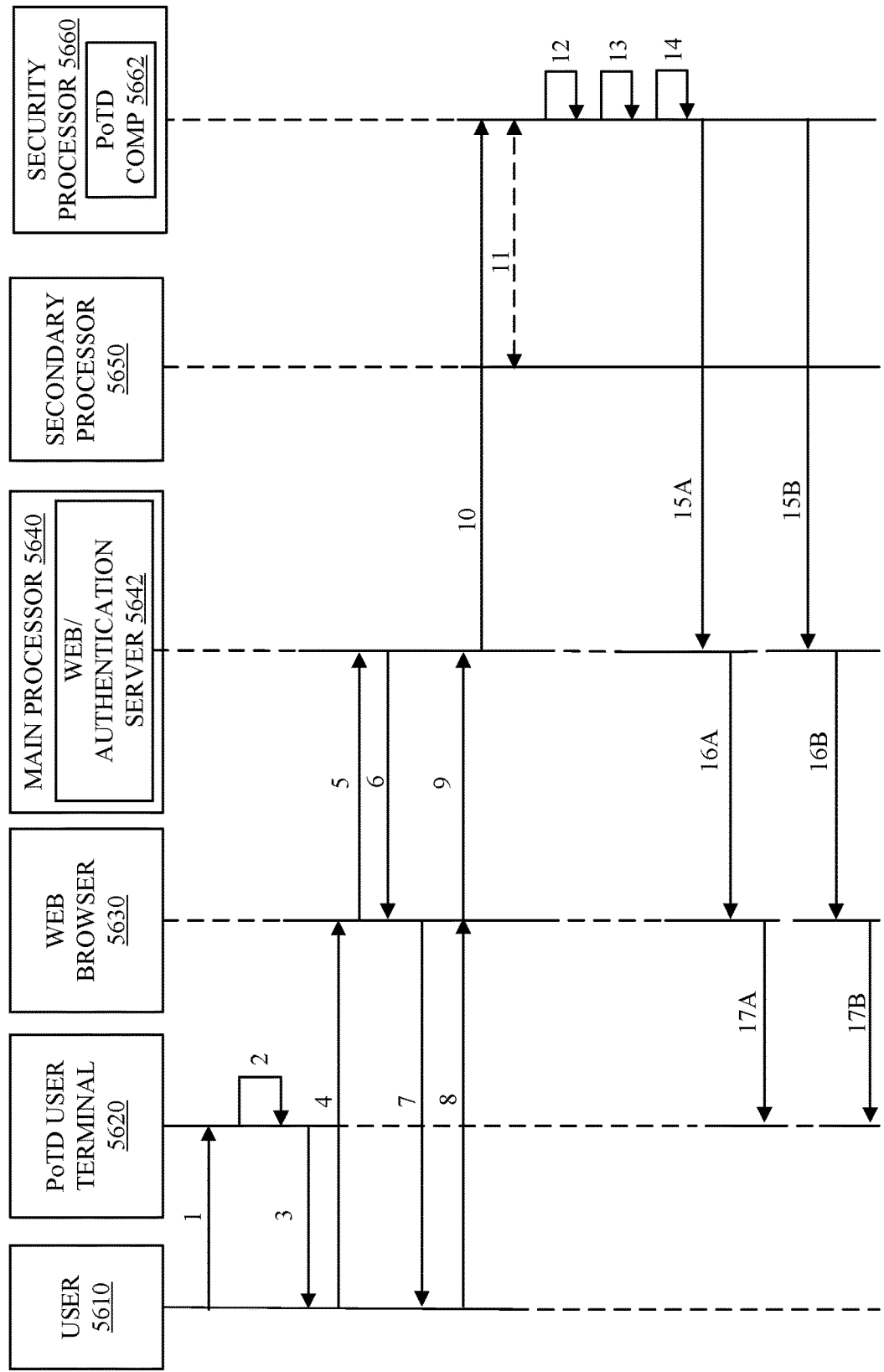
FIG. 5A is a flow diagram of an example flow for configuring a main processor in a customer premises equipment with an encrypted seed for PoTD processing with a security processor in accordance with implementations of this disclosure.

FIG. 5A is a flow diagram of an example flow 5600 for CPE processing an encrypted seed for PoTD processing via a security processor in accordance with implementations of this disclosure. The flow 5600 is operable between a user 5610, a PoTD component 5620 on a user terminal or device, a web browser 5630, a CPE including a main processor 5640 which has a web server 5642, a secondary or cable processor 5500, and a security processor 5660 which has a PoTD component 5662. The CPE can be the CPE 4000 of FIG. 4 and the CPE $1100_1$, $1100_2$, . . . , $1100_N$ as used in FIG. 1, with the inclusion of the security processor 3550 in a multi-processor configuration.

The user 5610 requiring access to the CPE can execute the PoTD component 5620 (1). The PoTD component 5620 can generate a PoTD based on an encrypted seed in the PoTD component 5620 (which is the same value stored on the CPE) and a current date (2). The generated PoTD can be displayed or made visible to the user 5610 (3). The user 5610 can open or access the appropriate webpage of the CPE via the web browser 5630 (4), which in turn can send an authentication and/or webpage request to the web server 5642 (5). The web server 5642 can perform a redirect message to the web browser 5630 (6) to request a credential form from the user 5610 (7). The user 5610 can enter the PoTD into the web browser 5630 (8), which in turn can forward the PoTD to the web server 5642 for authentication or verification (9). The web server 5642 can forward the PoTD to the PoTD component 5662 (10). The PoTD component 5662 can determine if the modem configuration file 4420 is already available on the main processor 5410 and/or security processor 5660, extract an encrypted seed if the modem configuration file 4420 is available, and store as a global variable. The encrypted seed can be stored locally on the security processor 5660. That is, the encrypted seed can be stored locally where the PoTD component is located. This can be a one-time operation. In the implementations described herein, if the CPE is reprovisioned, then this operation is done again. If the modem configuration file 4420 is not available on the main processor 5640 and/or security processor 5660, then the PoTD component 5662 can make an API call to the secondary processor 5650 to get the modem configuration file (11). The PoTD component 5662 can then fetch the encrypted seed from the modem configuration file and store the encrypted seed as a global variable in the PoTD component 5662 (12). As described, the encrypted seed can be stored locally on the security processor 5660. That is, the encrypted seed can be stored locally where the PoTD component is located. In implementations, the PoTD component 5662 can delete the modem configuration file once the encrypted seed is obtained. The PoTD component 5662 can generate the PoTD using the encrypted seed and the current date (13). The PoTD component 5662 can compare the generated PoTD with the user provided PoTD (14). In the event that the generated PoTD matches the user provided PoTD (15A), the web server 5642 can send an authorization message to the web browser 5630 (16A), which in turn can grant the user 5610 access to the CPE (17A). In implementations, the CPE can include a timer to limit an access session duration to a defined period of time. In implementations, the defined period of time can range from 15 to 60 minutes. In implementations, the defined period of time is dynamic, configurable, and/or combinations thereof. In the event that the generated PoTD does not match the user provided PoTD (15B), the web server 5642 can send a denial message to the web browser 5630 (16B), which in turn can deny the user 5610 access to the CPE (17B). In implementations, the CPE can include a counter to limit or set the number of retries a user has to gain access before the user is locked out. In implementations, the counter is dynamic, configurable, and/or combinations thereof.

The flow 5600 can use an already available API call (RPC call) to the secondary processor 5650 to obtain the modem configuration file. The flow 5600 does not need to create a new RPC to pass and get verified user entered password. The flow 5600 can enable the PoTD component 5662 to use a dynamic encrypted seed from the modem configuration file if and when the modem configuration file is updated.

Figure 6:
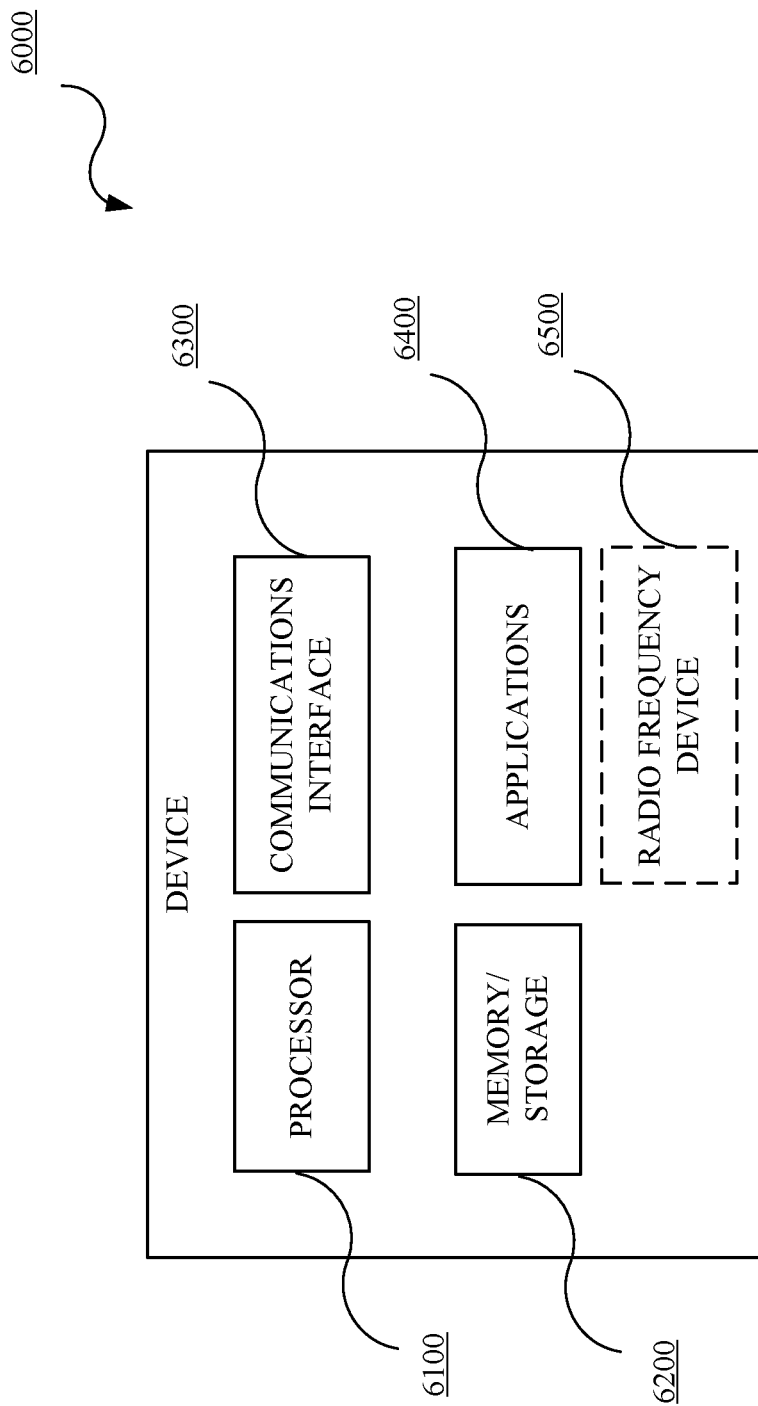
FIG. 6 is a block diagram of an example of a device in accordance with implementations of this disclosure.

FIG. 6 is a block diagram of an example of a device 6000 in accordance with implementations of this disclosure. The device 6000 may include, but is not limited to, a processor 6100, a memory/storage 6200, a communication interface 6300, and applications 6400. In an implementation, the device 6000 may include a radio frequency device 6500. The device 6000 may include or implement, for example, the CPE $1100_1$, $1100_2$, . . . , $1100_N$, the service provider back-office system 1200, the provisioning server 1210, the components in the network architecture 1500, the CPE 2000, the PoTD component 3200 on the user terminal or device, the web browser 3300, the CPE 3400, the components in the flow 3500, the CPE 4000, the PoTD component 5200 on the user terminal or device, the web browser 5300, the CPE 5400, and the components in the flow 5600. The applicable or appropriate techniques or methods described herein may be stored in the memory/storage 6200 and executed by the processor 6100 in cooperation with the memory/storage 6200, the communications interface 6300, the applications 6400, and the radio frequency device 6500 (when applicable), as appropriate. The device 6000 may include other elements which may be desirable or necessary to implement the devices, systems, and methods described herein. However, because such elements and steps are well known in the art, and because they do not facilitate a better understanding of the disclosed implementations, a discussion of such elements and steps may not be provided herein.

Figure 7:
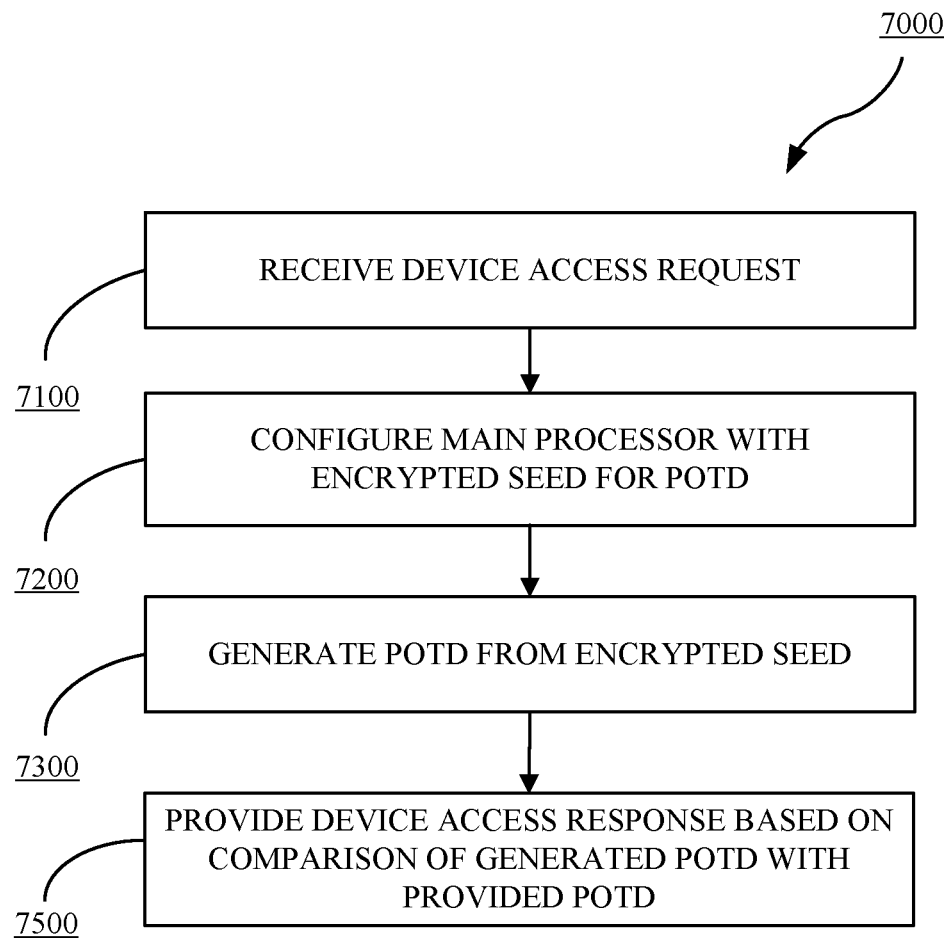
FIG. 7 is a flowchart of an example method for configuring a main processor in a customer premises equipment with an encrypted seed for PoTD in accordance with implementations of this disclosure.

FIG. 7 is a flowchart of an example method 7000 for configuring a main processor in a CPE with an encrypted seed for PoTD processing in accordance with implementations of this disclosure. The method 7000 includes: receiving 7100 a device access request; configuring 7200 the main processor with an encrypted seed for PoTD processing; generating 7300 a PoTD from the encrypted seed; and providing 7400 access response based on comparison of generated PoTD with provided PoTD. The method 7000 can be implemented, for example, in the CPE $1100_1$, $1100_2$, . . . , $1100_N$, the service provider back-office system 1200, the provisioning server 1210, the components in the network architecture 1500, the CPE 2000, the PoTD component 3200 on the user terminal or device, the web browser 3300, the CPE 3400, the components in the flow 3500, the CPE 4000, the PoTD component 5200 on the user terminal or device, the web browser 5300, the CPE 5400, the components in the flow 5600, the device 6000, the processor 6100, the memory/storage 6200, the communications interface 6300, the applications 6400, and the radio frequency device 6500 when available, as appropriate and applicable.

The method includes receiving 7100 a device access request. A user using a user device can send an access request to an access device such as a CPE. The user device includes a PoTD component which includes or has access to an encrypted seed used by the CPE. The PoTD component can generate a PoTD. The user can send the PoTD as requested during the verification process.

The method includes configuring 7200 a main processor in access device with an encrypted seed for PoTD processing. The device access includes a dual processor configuration with a main processor and a modem processor. The main processor has more capabilities than the modem processor in terms of processor power, computational power, memory, and other processing features. The modem processor handles data interface communications related to DOCSIS and other protocols. The main processor handles all other processing. For web based device access, a PoTD component on the main processor needs access to an encrypted seed. In implementations, the encrypted seed can be provided in a web configuration file in the main processor. In implementations, the PoTD component on the main processor can check if a modem configuration file is present on the main processor. If the modem configuration file is available, the PoTD component can fetch the encrypted seed from the modem configuration file. If the modem configuration file is not available, the main processor and/or the PoTD component can run an API call to obtain and store the modem configuration file on the main processor. The PoTD component on the main processor can then fetch and store the encrypted seed as a global variable for PoTD generation on the main processor. In implementations, a security processor can be used for PoTD processing as described herein. That is, the PoTD component is on the security processor instead on being on the main or primary processor. The encrypted seed can then also be stored on the security processor. That is, in some implementations, the encrypted seed is stored local to where the PoTD component is located.

The method includes generating 7300 a PoTD from the encrypted seed. The PoTD component on the main processor can generate a PoTD using the encrypted seed based on the received access request.

The method includes providing 7400 device access response based on comparison of generated PoTD with provided PoTD. The PoTD component on the main processor can compare the generated PoTD with a user provided PoTD. If the generated PoTD and the user provided PoTD match, the PoTD component on the main processor grants access. If the generated PoTD and the user provided PoTD does not match, the PoTD component on the main processor denies access. In implementations, a CPE can include a timer to limit an access session duration to a defined period of time. In implementations, the defined period of time can range from 15 to 60 minutes. In implementations, the defined period of time is dynamic, configurable, and/or combinations thereof. In implementations, the CPE can include a counter to limit or set the number of retries a user has to gain access before the user is locked out. In implementations, the counter is dynamic, configurable, and/or combinations thereof.

Disclosed herein are methods and systems for configuring a main processor or security processor in a customer premises equipment with an encrypted seed for PoTD processing. In implementations, a customer premises equipment device includes a modem processor, a main processor in communication with the modem processor, and a password-of-the-day component included on a security processor when present or the main processor. The main processor is configured to receive, via the modem processor from a user device, an access request to the customer premises equipment device. In in response to the access request, the password-of-the-day component is configured to access an encrypted seed stored on the main processor when the password-of-the-day component is included on the main processor or access the encrypted seed stored on the security processor when the password-of-the-day component is included on the security processor when present, generate a password-of-the-day from the encrypted seed, and provide an access response based on comparison of the generated password-of-the-day with a password-of-the-day provided via the user device.

In implementations, a web server configuration file on the main processor is provisioned with the encrypted seed and the password-of-the-day component is configured to fetch the encrypted seed from the web server configuration file. In implementations, the password-of-the-day component is further configured to fetch the encrypted seed from a modem configuration file previously obtained from the modem processor by the main processor or the security processor when present, and store the encrypted seed as a global variable for access by the password-of-the-day component for password-of-the-day generation. In implementations, the password-of-the-day component is further configured to get a modem configuration file from the modem processor to the main processor or the security processor when present using an available Application Programming Interface call, fetch the encrypted seed from the modem configuration file on the main processor or the security processor when present, and store the encrypted seed as a global variable for access by the password-of-the-day component for password-of-the-day generation. In implementations, the modem configuration file is obtained once for a new or updated encrypted seed. In implementations, the password-of-the-day component is further configured to delete the modem configuration file from the main processor or the security processor when present once the encrypted seed is saved as the global variable for the password-of-the-day component. In implementations, the password-of-the-day component is further configured to determine whether a modem configuration file from the modem processor is available on the main processor or the security processor when present, obtain the modem configuration file from the modem processor to the main processor or the security processor when present using an available Application Programming Interface call if the modem configuration file is not on the main processor or the security processor when present, fetch the encrypted seed from the modem configuration file on the main processor or the security processor when present, and store the encrypted seed as a global variable for access by the password-of-the-day component for password-of-the-day generation. In implementations, the modem configuration file is obtained once for a new or updated encrypted seed. In implementations, the password-of-the-day component is further configured to delete the modem configuration file obtained from the main processor or the security processor when present once the encrypted seed is saved as the global variable for the password-of-the-day component. In implementations, the access request is a web based access request. In implementations, the access request is a Hypertext Transfer Protocol Secure (HTTPS) protocol based access request.

Disclosed herein is a method for configuring a main processor or security processor in a customer premises equipment with an encrypted seed for PoTD processing. In implementations, a method for password-of-the-day processing includes receiving, at a main processor via a secondary processor, an access request to an access device from a user device, the main processor and the secondary processor in a multi-processor configuration on the access device, accessing, by a password-of-the-day component on the main processor or an available security processor in response to the access request, an encrypted seed stored on the main processor or the available security processor, respectively, generating, by the password-of-the-day component on the main processor or the available security processor, a password-of-the-day from the encrypted seed, verifying, by the password-of-the-day component on the main processor or the available security processor, a password-of-the-day provided via the user device against the generated password-of-the-day, and transmitting, by the password-of-the-day component on the main processor or the available security processor, a decision to the user device based on verification processing results.

In implementations, a web server configuration file on the main processor is provisioned with the encrypted seed and the accessing further includes fetching the encrypted seed from the web server configuration file. In implementations, the accessing further includes fetching the encrypted seed from a modem configuration file previously obtained from the secondary processor by the main processor or the available security processor, and storing the encrypted seed as a global variable for access by the password-of-the-day component for password-of-the-day generation. In implementations, the accessing further includes getting a modem configuration file from the secondary processor to the main processor or the available security processor using an available Application Programming Interface call, fetching the encrypted seed from the modem configuration file on the main processor or the available security processor, and storing the encrypted seed as a global variable for access by the password-of-the-day component for password-of-the-day generation. In implementations, the accessing further includes starting a timer to limit an access session duration to a configurable period of time when the user gains access to the access device and setting a number of retries the user has to gain access before the user is locked out when the user is denied access to the access device. In implementations, the accessing further includes determining whether a modem configuration file from the secondary processor is available on the main processor or the available security processor, obtaining the modem configuration file from the secondary processor to the main processor or the available security processor using an available Application Programming Interface call if the modem configuration file is not on the main processor or the available security processor, fetching the encrypted seed from the modem configuration file on the main processor or the available security processor, and storing the encrypted seed as a global variable for access by the password-of-the-day component for password-of-the-day generation.

In implementations, an access device includes a primary processor in communication with a secondary processor, and a password-of-the-day component on one of the primary processor or a security processor. In response to an access request received at the access device, the password-of-the-day component is configured to access a locally stored encrypted seed, verify a user provided password-of-the-day with a password-of-the-day generated from the encrypted seed, and send an access response based on results from a verification process to the user device.

In implementations, a web server configuration file on the primary processor is provisioned with the encrypted seed and the password-of-the-day component is configured to fetch the encrypted seed from the web server configuration file. In implementations, the password-of-the-day component is further configured to fetch the encrypted seed from a modem configuration file, the modem configuration file obtained from the secondary processor and stored locally, and store the encrypted seed as a global variable for access by the password-of-the-day component for password-of-the-day generation.

Disclosed herein is a method for configuring a main processor or security processor in a customer premises equipment with an encrypted seed for PoTD processing. A customer premises equipment device includes a modem processor, a main processor in communication with the modem processor; and a password-of-the-day component included on the main processor. The main processor is configured to receive, via the modem processor from a user device, an access request to the customer premises equipment device. In response to the access request, the password-of-the-day component is configured to access an encrypted seed stored on the main processor, generate a password-of-the-day from the encrypted seed, and provide an access response based on comparison of the generated password-of-the-day with a password-of-the-day provided via the user device.

In implementations, a web server configuration file on the main processor is provisioned with the encrypted seed and the password-of-the-day component is configured to fetch the encrypted seed from the web server configuration file. In implementations the password-of-the-day component is further configured to fetch the encrypted seed from a modem configuration file previously obtained from the modem processor by the main processor, and store the encrypted seed as a global variable for access by the password-of-the-day component for password-of-the-day generation. In implementations, the password-of-the-day component is further configured to get a modem configuration file from the modem processor to the main processor using an available Application Programming Interface call when the modem configuration file is unavailable on the main processor, fetch the encrypted seed from the modem configuration file on the main processor, and store the encrypted seed as a global variable for access by the password-of-the-day component for password-of-the-day generation. In implementations, the modem configuration file is obtained once for a new or updated encrypted seed. In implementations, the password-of-the-day component is further configured to delete the modem configuration file from the main processor once the encrypted seed is saved as the global variable for the password-of-the-day component. In implementations, the customer premises equipment device further includes a security processor. The password-of-the-day component is included on the security processor in lieu of on the main processor and the password-of-the-day component on the security processor is configured to access the encrypted seed from the security processor. In implementations, the password-of-the-day component on the security processor is configured to fetch the encrypted seed from a web server configuration file on the main processor. In implementations, the password-of-the-day component on the security processor is configured to fetch the encrypted seed from a modem configuration file previously obtained from the modem processor by the security processor and store the encrypted seed as a global variable for access by the password-of-the-day component for password-of-the-day generation. In implementations, the password-of-the-day component on the security processor is further configured to get a modem configuration file from the modem processor to the security processor using an available Application Programming Interface call when the modem configuration file is not present on the security processor, fetch the encrypted seed from the modem configuration file on the security processor, and store the encrypted seed as a global variable for access by the password-of-the-day component for password-of-the-day generation. In implementations, the access request is a web based access request. In implementations, the access request is a Hypertext Transfer Protocol Secure (HTTPS) protocol based access request.

In implementations, a method for password-of-the-day processing includes receiving, at a main processor via a secondary processor, an access request to an access device from a user device, the main processor and the secondary processor in a multi-processor configuration on the access device, accessing, by a password-of-the-day component on the main processor in response to the access request, an encrypted seed stored on the main processor, generating, by the password-of-the-day component on the main processor, a password-of-the-day from the encrypted seed, verifying, by the password-of-the-day component on the main processor, a password-of-the-day provided via the user device against the generated password-of-the-day, and transmitting, by the password-of-the-day component on the main processor, a decision to the user device based on verification processing results.

In implementations, a web server configuration file on the main processor is provisioned with the encrypted seed and the accessing further includes fetching the encrypted seed from the web server configuration file. In implementations, the accessing further includes fetching the encrypted seed from a modem configuration file previously obtained from the secondary processor by the main processor, and storing the encrypted seed as a global variable for access by the password-of-the-day component for password-of-the-day generation. In implementations, the accessing further includes getting a modem configuration file from the secondary processor to the main processor using an available Application Programming Interface call when the modem configuration file is unavailable on the main processor, fetching the encrypted seed from the modem configuration file on the main processor, and storing the encrypted seed as a global variable for access by the password-of-the-day component for password-of-the-day generation. In implementations, the accessing further includes starting a timer to limit an access session duration to a configurable period of time when the user device gains access to the access device and setting a number of retries the user device has to gain access before the user device is locked out when the user device is denied access to the access device. In implementations, the encrypted seed is stored on a security processor, wherein the password-of-the-day component is on the security processor, and wherein the accessing accesses the encrypted seed stored on the security processor by the password-of-the-day component on the security processor. In implementations, the accessing further includes fetching the encrypted seed from a web server configuration file on the main processor, wherein the web server configuration file is provisioned with the encrypted seed. In implementations, the accessing further includes fetching the encrypted seed from a modem configuration file previously obtained from the secondary processor by the security processor; and storing the encrypted seed as a global variable for access by the password-of-the-day component for password-of-the-day generation.

In implementations, an access device includes a primary processor in communication with a secondary processor; and a password-of-the-day component on the primary processor, wherein, in response to an access request received at the access device. The password-of-the-day component is configured to access a locally stored encrypted seed, verify a user provided password-of-the-day with a password-of-the-day generated from the encrypted seed, and send an access response based on results from a verification process to a user device.

In implementations, a web server configuration file on the primary processor is provisioned with the encrypted seed and the password-of-the-day component is configured to fetch the encrypted seed from the web server configuration file. In implementations, the password-of-the-day component is further configured to fetch the encrypted seed from a modem configuration file, the modem configuration file obtained from the secondary processor and stored locally, and store the encrypted seed as a global variable for access by the password-of-the-day component for password-of-the-day generation. In implementations, the access device further including a security processor, where the password-of-the-day component is included on the security processor in lieu of on the primary processor.

Although some implementations herein refer to methods, it will be appreciated by one skilled in the art that they may also be embodied as a system or computer program product. Accordingly, aspects of the present disclosure may take the form of an entirely hardware implementation, an entirely software implementation (including firmware, resident software, micro-code, etc.) or an implementation combining software and hardware aspects that may all generally be referred to herein as a "processor," "device," or "system." Furthermore, aspects of the present disclosure may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain implementations, it is to be understood that the disclosure is not to be limited to the disclosed implementations but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A customer premises equipment device, comprising:
   a modem processor;
   a main processor in communication with the modem processor; and
   a password-of-the-day component included on the main processor,
   wherein the main processor is configured to receive, via the modem processor from a user device, an access request to the customer premises equipment device, and
   wherein, in response to the access request, the password-of-the-day component is configured to:
   access an encrypted seed stored on the main processor;
   generate a password-of-the-day from the encrypted seed; and
   provide an access response based on comparison of the generated password-of-the-day with a password-of-the-day provided via the user device.

2. The customer premises equipment device of claim 1, wherein a web server configuration file on the main processor is provisioned with the encrypted seed and the password-of-the-day component is configured to fetch the encrypted seed from the web server configuration file.

3. The customer premises equipment device of claim 1, wherein the password-of-the-day component is further configured to:
   fetch the encrypted seed from a modem configuration file previously obtained from the modem processor by the main processor; and
   store the encrypted seed as a global variable for access by the password-of-the-day component for password-of-the-day generation.

4. The customer premises equipment device of claim 1, wherein the password-of-the-day component is further configured to:
   get a modem configuration file from the modem processor to the main processor using an available Application Programming Interface call when the modem configuration file is unavailable on the main processor;
   fetch the encrypted seed from the modem configuration file on the main processor; and
   store the encrypted seed as a global variable for access by the password-of-the-day component for password-of-the-day generation.

5. The customer premises equipment device of claim 4, wherein the modem configuration file is obtained once for a new or updated encrypted seed.

6. The customer premises equipment device of claim 5, wherein the password-of-the-day component is further configured to:
   delete the modem configuration file from the main processor once the encrypted seed is saved as the global variable for the password-of-the-day component.

7. The customer premises equipment device of claim 1, further comprising:
   a security processor,
   wherein the password-of-the-day component is included on the security processor in lieu of on the main processor, and
   wherein the password-of-the-day component on the security processor is configured to access the encrypted seed from the security processor.

8. The customer premises equipment device of claim 7, wherein the password-of-the-day component on the security processor is configured to fetch the encrypted seed from a web server configuration file on the main processor.

9. The customer premises equipment device of claim 7, wherein the password-of-the-day component on the security processor is configured to:
   fetch the encrypted seed from a modem configuration file previously obtained from the modem processor by the security processor; and
   store the encrypted seed as a global variable for access by the password-of-the-day component for password-of-the-day generation.

10. The customer premises equipment device of claim 7, wherein the password-of-the-day component on the security processor is further configured to:
   get a modem configuration file from the modem processor to the security processor using an available Application Programming Interface call when the modem configuration file is not present on the security processor;
   fetch the encrypted seed from the modem configuration file on the security processor; and
   store the encrypted seed as a global variable for access by the password-of-the-day component for password-of-the-day generation.

11. The customer premises equipment device of claim 1, wherein the access request is a web based access request.

12. The customer premises equipment device of claim 1, wherein the access request is a Hypertext Transfer Protocol Secure (HTTPS) protocol based access request.

13. A method for password-of-the-day processing, the method comprising:
   receiving, at a main processor via a secondary processor, an access request to an access device from a user device, the main processor and the secondary processor in a multi-processor configuration on the access device;
   accessing, by a password-of-the-day component on the main processor in response to the access request, an encrypted seed stored on the main processor;
   generating, by the password-of-the-day component on the main processor, a password-of-the-day from the encrypted seed;
   verifying, by the password-of-the-day component on the main processor, a password-of-the-day provided via the user device against the generated password-of-the-day; and
   transmitting, by the password-of-the-day component on the main processor, a decision to the user device based on verification processing results.

14. The method of claim 13, wherein a web server configuration file on the main processor is provisioned with the encrypted seed and the accessing further comprises:
   fetching the encrypted seed from the web server configuration file.

15. The method of claim 13, wherein the accessing further comprises:
   fetching the encrypted seed from a modem configuration file previously obtained from the secondary processor by the main processor; and
   storing the encrypted seed as a global variable for access by the password-of-the-day component for password-of-the-day generation.

16. The method of claim 13, wherein the accessing further comprises:
   getting a modem configuration file from the secondary processor to the main processor using an available Application Programming Interface call when the modem configuration file is unavailable on the main processor;
   fetching the encrypted seed from the modem configuration file on the main processor; and
   storing the encrypted seed as a global variable for access by the password-of-the-day component for password-of-the-day generation.

17. The method of claim 13, wherein the accessing further comprises:
   starting a timer to limit an access session duration to a configurable period of time when the user device gains access to the access device; and
   setting a number of retries the user device has to gain access before the user device is locked out when the user device is denied access to the access device.

18. The method of claim 13, wherein the encrypted seed is stored on a security processor, wherein the password-of-the-day component is on the security processor, and wherein the accessing accesses the encrypted seed stored on the security processor by the password-of-the-day component on the security processor.

19. The method of claim 18, wherein the accessing further comprises:
   fetching the encrypted seed from a web server configuration file on the main processor, wherein the web server configuration file is provisioned with the encrypted seed.

20. The method of claim 18, wherein the accessing further comprises:
   fetching the encrypted seed from a modem configuration file previously obtained from the secondary processor by the security processor; and
   storing the encrypted seed as a global variable for access by the password-of-the-day component for password-of-the-day generation.

21. An access device, comprising:
   a primary processor in communication with a secondary processor, wherein a web server configuration file on the primary processor is provisioned with an encrypted seed; and
   a password-of-the-day component on the primary processor, wherein, in response to an access request received at the access device, the password-of-the-day component is configured to:
      fetch the encrypted seed from the web server configuration file;
      verify a user provided password-of-the-day with a password-of-the-day generated from the encrypted seed; and
      send an access response based on results from a verification process to a user device.

22. The access device of claim 21, further comprising:
   a security processor,
   wherein the password-of-the-day component is included on the security processor in lieu of on the primary processor.

23. An access device, comprising:
   a primary processor in communication with a secondary processor; and
   a password-of-the-day component on the primary processor, wherein, in response to an access request received at the access device, the password-of-the-day component is configured to:
      fetch an encrypted seed from a modem configuration file, the modem configuration file obtained from the secondary processor and stored locally;
      verify a user provided password-of-the-day with a password-of-the-day generated from the encrypted seed; and
      send an access response based on results from a verification process to a user device.

24. The access device of claim 23, wherein the password-of-the-day component is further configured to:
   store the encrypted seed as a global variable for access by the password-of-the-day component for password-of-the-day generation.

* * * * *